(12) United States Patent
Higuchi et al.

(10) Patent No.: US 8,834,034 B2
(45) Date of Patent: Sep. 16, 2014

(54) OUTER RING FOR A SHELL-TYPE RADIAL NEEDLE BEARING AND MANUFACTURING METHOD THEREOF

(75) Inventors: Masato Higuchi, Gunma (JP); Noriyuki Takeo, Gunma (JP); Yoshiaki Komura, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/391,933

(22) PCT Filed: Sep. 22, 2011

(86) PCT No.: PCT/JP2011/071656
§ 371 (c)(1),
(2), (4) Date: Apr. 25, 2012

(87) PCT Pub. No.: WO2012/043392
PCT Pub. Date: Apr. 5, 2012

(65) Prior Publication Data
US 2012/0207421 A1    Aug. 16, 2012

(30) Foreign Application Priority Data

Sep. 27, 2010  (JP) ................................ 2010-215340
Aug. 31, 2011  (JP) ................................ 2011-188080
Aug. 31, 2011  (JP) ................................ 2011-188082
Aug. 31, 2011  (JP) ................................ 2011-188084

(51) Int. Cl.
| F16C 33/58 | (2006.01) |
| F16C 33/34 | (2006.01) |
| F16D 3/41  | (2006.01) |
| F16C 33/64 | (2006.01) |
| F16C 19/46 | (2006.01) |
| F16D 3/38  | (2006.01) |

(52) U.S. Cl.
CPC ............. *F16D 3/385* (2013.01); *F16C 2240/18* (2013.01); *F16D 3/41* (2013.01); *F16C 33/64* (2013.01); *F16C 19/466* (2013.01); *F16C 33/588* (2013.01)
USPC ........... 384/569; 384/425; 384/564; 384/565; 384/586

(58) Field of Classification Search
USPC ......... 384/276, 425, 456, 513, 548, 565, 569, 384/586–587, 564; 464/128, 132, 136
See application file for complete search history.

(56) References Cited

U.S. PATENT DOCUMENTS

| 3,324,681 | A | * | 6/1967 | Honsberger et al. | 464/130 |
| 3,589,143 | A | * | 6/1971 | Batt | 384/564 |
| 3,677,032 | A | * | 7/1972 | Suzuki | 384/569 |
| 3,950,834 | A | * | 4/1976 | Pitner | 29/898.066 |
| 4,050,130 | A | * | 9/1977 | Pitner | 384/425 |
| 5,147,140 | A | * | 9/1992 | Murakami et al. | 384/492 |
| 5,314,380 | A | * | 5/1994 | Yamamoto | 464/128 |
| 5,695,405 | A | * | 12/1997 | Kono | 464/128 |
| 6,334,714 | B1 | * | 1/2002 | Harimoto et al. | 384/569 |
| 7,101,285 | B2 | * | 9/2006 | Sekine | 464/132 |

FOREIGN PATENT DOCUMENTS

| DE | 19958059 A1 | * | 6/2000 | ............ F16C 19/24 |
| JP | 53-35841 |   | 4/1978 | |
| JP | 57137767 A | * | 8/1982 | ............ F16H 57/04 |
| JP | 3-62232 |   | 6/1991 | |
| JP | 4-14819 |   | 2/1992 | |
| JP | 6-280890 |   | 10/1994 | |
| JP | 7-228101 |   | 8/1995 | |
| JP | 2000110841 A | * | 4/2000 | ............ F16C 33/62 |
| JP | 2002089550 A | * | 3/2002 | ............ F16C 19/46 |
| JP | 2005069337 A | * | 3/2005 | ............ F16C 33/78 |
| JP | 2006-125513 |   | 5/2006 | |
| JP | 2007-32801 |   | 2/2007 | |
| JP | 2008-188610 |   | 8/2008 | |
| JP | 2008-309312 |   | 12/2008 | |
| JP | 2009-191976 |   | 8/2009 | |
| JP | 2010-159805 |   | 7/2010 | |

OTHER PUBLICATIONS

International Search Report dated Dec. 20, 2011, from corresponding International Application No. PCT/JP2011/071656.

* cited by examiner

*Primary Examiner* — Marcus Charles
(74) *Attorney, Agent, or Firm* — Katten Muchin Rosenman LLP

(57) ABSTRACT

An outer ring 6a for a shell-type radial needle bearing having a cylindrical shape with a bottom is achieved for which fatigue life of the bottom plate section 9a and the continuous section between the bottom plate section 9a and the cylindrical section 8a is improved, as well as the anti-corrosion characteristic of the outer ring 6a is improved and the outer ring 6a can be prevented from coming out of the bearing without an increase in cost. After obtaining an intermediate raw material 35 having a cylindrical section and a bottom plate section from a metal raw material, shot peening is performed on the intermediate material 35 to create residual compressive stress in the surface and surface layer section on the outer surface side of the cylindrical section 8a and the bottom plate section 9a such that the residual compressive stress in the surface layer section on the outer surface side is greater than the in the surface layer section on the inner surface side, and from the surface to a depth of 0.03 mm is 700 MPa to 1600 MPa.

4 Claims, 7 Drawing Sheets

OUTER RING FOR A SHELL-TYPE RADIAL NEEDLE BEARING AND MANUFACTURING METHOD THEREOF

CROSS-REFERENCE TO RELATED APPLICATIONS

This application is a national phase application under 35 U.S.C. §371 of and claims priority to PCT/JP2011/071656 filed Apr. 22, 2011.

PCT/JP2011/071656 claims priority to Japanese patent application 2011188084 filed Aug. 31, 2011, Japanese patent application 2011188082 filed Aug. 31, 2011, Japanese patent application 2011188080 filed Aug. 31, 2011, and Japanese patent application 2010215340 filed Sep. 27, 2010.

BACKGROUND OF THE INVENTION

1. Field of the Invention

The present invention relates to an improvement of an outer ring and manufacturing method thereof for a shell-type radial needle bearing that is assembled, for example, in a rotation support section of a joint cross type universal joint called a Cardan joint.

2. Description of the Related Art

Conventionally, joint cross type universal joints called Cardan joints have been used, for example, in a steering apparatus or propeller shaft of an automobile, for joining the end sections of a pair of rotating shafts that are not aligned with each other in order to be able to transmit a rotating force (torque). As illustrated in FIG. 6, this kind of joint cross type universal joint comprises: a pair of yokes 1a, 1b that are fastened to the end sections of both of the rotating shaft, the end sections of each yoke being fork shaped; and a joint cross 2. A pair of circular holes 3 that are concentric with each other are formed in the pair of tip end sections of each yokes 1a, 1b. The tip end sections of the shaft sections 4 of the joint cross 2 are supported inside these circular holes 3 by shell-type radial needle bearings 5 such that they can rotate.

As illustrated in FIG. 7, these shell-type radial needle bearings 5 comprise an outer ring 6 and a plurality of needles 7. The outer ring 6, for example, is made by performing a drawing process using a press on a metal plate as a raw material, and forming that raw material into a cylindrical shape with a bottom such that this outer ring 6 comprises: a cylindrical section 8 that fits inside the circular hole 3, a bottom plate section 9 that covers the opening on one end of the cylindrical section 8 (left end in FIG. 7), and a circular ring shaped inward facing flange section 10 that is formed by bending the other end of the cylindrical section 8 (right end in FIG. 7) toward the inside in the radial direction. The inner circumferential surface of the cylindrical section 8 functions as cylindrical concave shaped outer raceway 11. A spherical convex section 12 is formed in the center section of the inside surface of the bottom plate section 9. Moreover, needles 7 are provided between a cylindrical convex shaped inner raceway 13 that is formed around the outer circumferential surface on the tip end section of the shaft section 4 of the joint cross 2 and the outer raceway 11 such that the needles can roll freely.

In this state, the center section of surface on the tip end of the shaft section 4 comes in contact with the surface on the tip end of the curved convex section 12. In other words, in the example in the figure, by having only the center section of the tip end surface of the shaft section 4 come in contact with the tip end surface of the curved convex section 12 instead of having the entire tip end surface of the shaft section 4 come in contact with the inside surface of the bottom plate section 9, the friction force that acts on this area of contact is sufficiently reduced. As a result, together with preventing problems such as abnormal wear and burning of the area of contact during operation, the resistance to rotation in the universal joint is reduced by reducing the bending torque, which is torque necessary for causing the yokes 1a, 1b to swivel with respect to the joint cross 2. Moreover, by applying a suitable pressure in advance to the area of contact between the tip end surface of the shaft section 4 and the tip end section of the curved convex section 12, movement in the axial direction of the shaft section 4 in the inside of the shell-type radial needle bearing 5 is prevented, and thus movement inside joint section between the yokes 1a, 1b and the joint cross 2 is prevented.

Furthermore, in the example in the figure, by compressing and holding a circular ring shaped seal member 15 between a stepped section 14 that exists around the base end edge of the shaft section 4, and the inward facing flange section 10 of the outer ring 6, the internal space of the shell-type radial needle bearing 5 is sealed.

When both of the rotating shafts that are connected by way of the universal joint rotate, an axial load is repeatedly applied to the bottom plate section 9 of the outer ring 6 from the tip end surface of the shaft section 4. This axial load becomes larger proportional to the size of the rotation force that is transmitted by way of the universal joint. On the other hand, in the case of an automobile steering apparatus, which is one example of an apparatus that uses a universal joint, in recent years electrically powered power steering apparatuses are becoming popular. Of this kind of electrically-powered power steering apparatus, in a column type power steering apparatus in which an electric motor, which functions as the auxiliary power source, is located in a position (steering wheel side) further upstream in the direction of transmission of the rotation force during steering than the position of the universal joint, the rotation force that is transmitted by way of the universal joint becomes large. As a result, the axial load that is repeatedly applied to the bottom plate section 9 also becomes large, so unless the fatigue strength of the outer ring 6 is sufficiently maintained, there is a possibility that damage such as cracking will occur in the center section of the bottom plate section 9 or in the continuous section between this bottom plate section 9 and the cylindrical section 8 as illustrated in FIG. 8.

The fatigue strength of the outer ring 6 can be improved by increasing the overall thickness of the outer ring 6. However, by employing this method, the overall size and weight of the outer ring 6 is increased, and because of this, the size and weight of the universal joint also increases. In many cases there is also a need to make the universal joint more compact and lightweight. Therefore, in the field of universal joints that are assembled in the column-type electrically powered power steering apparatuses above, being able to maintain durability without increasing the thickness of the outer ring 6 is desirable, while in other fields, being able to sufficiently maintain durability without reducing the thickness of the outer ring 6 is desirable.

Construction to meet these needs has been conventionally known, such as the construction illustrated in FIG. 9 wherein the cross-sectional shape of the bottom plate section 9a of the outer ring 6a is multi-stepped shaped (refer to JP03-62232 (A), JP04-14819(U), and JP2006-125513(A)). By employing construction as illustrated in FIG. 9, it is possible to improve the fatigue strength of the bottom plate section 9a and the continuous section between this bottom plate section 9a and the cylindrical section 8 without having to increase the thickness of the outer ring 6a. However, by employing construction such as illustrated in FIG. 9, there are problems in that the design of the die used in manufacturing becomes more complicated due to the complexity of the shape of the bottom plate section 9a, as well as adjustment of this die becomes troublesome, productivity decreases, and there is an increase in manufacturing cost.

Furthermore, as described above, as the rotation force that is inputted to the universal joint increases, in the worst case, the shell-type radial needle bearing 5 that is pressure fitted into the circular hole 3 may come out from the yoke, and position shift in rotation of the rotating shaft may occur. In regards to this, surface processing such as surface texturing is performed on the outer surface of the outer ring 6 of the shell-type radial needle bearing 5. However, depending on the press processing, there is a problem in that performing this kind of surface processing may be difficult, so it may become necessary to perform a surface processing using a different process, which results in an increase in labor and a large increase in cost.

On the other hand, because the outer ring 6 is metal, there is also a need for the shell-type radial needle bearing 5 to be able to resist corrosion. Particularly, when the universal joint is used in an automobile, this shell-type radial needle bearing 5 is located in an environment that is exposed to wind and rain, so there is a special need for the outer ring 6 to have the ability to resist corrosion, so corrosion resistant coating may be applied to the outer ring 6. However, even in this kind of case, there is a problem in that sufficient adhesion of the anti-corrosive coating on the outer ring 6 that is normally used the shell-type radial needle bearing 5 may not be able to be obtained.

Furthermore, before assembly, there may be extremely minute oxides or extremely thin spot-like oxides already existing on the metal outer ring 6. Finding the existence of such oxides is very difficult, and when left as is, problems occur in that there is an increase in resistance when the pressure fitting of the bearing is implemented, and the oxide component may enter into the bearing during operation, so even the smallest oxides are removed beforehand. However, the work for removing these extremely small oxides, which are difficult to find, requires much labor and time, and increases cost.

RELATED LITERATURE

Patent Literature

Patent literature 1: JP03-62232(A)
Patent literature 2: JP04-14819(U)
Patent literature 3: JP2006-125513(A)
Patent literature 4: JP2008-188610(A)

SUMMARY OF THE INVENTION

Problems to be Solved by the Invention

In consideration of the problems above, an object of the present invention is to provide construction of an outer ring having a cylindrical shape with a bottom for a shell-type radial needle bearing, that is at least able to improves the fatigue strength of the bottom plate section and the continuous section between the bottom plate section and cylindrical section without an increase in the size of the outer ring due to an increase in the outer-diameter dimensions and thickness thereof or complex shape of the bottom plate section.

In addition, an object of the present invention is to provide construction of an outer ring of a shell-type radial needle bearing that is capable of preventing the outer ring coming out from the bearing and position shift such as rotation of the rotating shaft due to that, provide construction that gives an anti-corrosive capability to the outer ring, and provide construction that further improves the ease of assembly of the outer ring without a pointless increase in cost.

Means for Solving the Problems

The outer ring for a shell-type radial needle bearing of the present invention comprises: a cylindrical section having an outer raceway formed around the inner circumferential surface thereof; and a bottom plate section that closes off the opening on one end of the cylindrical section. This outer ring is used in the state that the cylindrical section is fitted and fastened inside a circular hole that is formed in an outside member, for example, with a interference fit, a plurality of needles are located between the outer raceway and an inner raceway that is formed around the outer circumferential surface of an end section of a circular column shaped inside member so as to be able to roll freely, and the end surface of the inside member comes in contact with the center section of the inner surface of the bottom plate section. The present invention can suitably be applied to construction wherein the end surface of the inside member comes in contact with only the center section of the inner surface of the bottom plate section.

Particularly, in the outer ring for a shell-type radial needle bearing of the present invention, residual compressive stress exists in the cylindrical section and the bottom plate section. The residual compressive stress on the surface layer section on the outer surface side of the cylindrical section and bottom plate section is greater than in the surface layer section on the inner surface side of the cylindrical section and bottom plate section. Furthermore, of the surface layer section on the outer surface side of the cylindrical section and the bottom plate section, the size of the residual compressive stress in the surface layer section from the surface to a depth of 0.03 mm is 700 MPa to 1600 MPa. Preferably, of the surface layer section, the size of the residual compressive stress on the surface is 1100 MPa to 1500 MPa. In the present invention, the surface layer section includes both the surface and the surface layer section.

Preferably, the thickness dimension (T) of the bottom plate section is greater than the thickness dimension (t) of the cylindrical section. More specifically, the thickness dimension (T) of the bottom plate section is 105% to 200% that of the thickness (t) of the cylindrical section (T=(1.05 to 2) t), and preferably, 120% to 150% (T=(1.2 to 1.5) t). Even more specifically, the thickness dimension (T) of the bottom plate section is 1.2 mm to 3 mm. The present invention can be applied to the case wherein the dimension in the radial direction of the outer ring for the radial needle bearing is within the range 5 mm to 50 mm, and preferably within the range 5 mm to 30 mm.

The method for manufacturing the outer ring for a shell-type radial needle bearing of the present invention comprises the steps of performing a drawing process on a circular plate shaped metal raw material to form a circular shape, or performing plastic working of a circular column shaped metal raw material to form a circular shape so as to obtain an intermediate raw material having a cylindrical section and a bottom plate section; and then performing shot peening of this intermediate raw material so as to create residual compressive stress in the surface layer section of the surfaces on the outer surface side of the cylindrical section and the bottom plate section. In the present invention, shot blasting is included in the shot peening.

Preferably, by properly regulating the shot peening conditions, the surface roughness of the surfaces on the outer surface side of the cylindrical section and the bottom plate section are controlled, and the adhesion between these surfaces and an anti-corrosion coating is improved. Moreover, preferably, by similarly controlling the surface roughness of the surfaces on the outer surface side of the cylindrical section and the bottom plate section, the outer ring can be prevented from coming out from the circular hole that is formed in the outside member. Furthermore, preferably, by removing the oxides that exist on the surfaces on the outer surface side of the cylindrical section and the bottom plate section of the outer ring before being assembled, the ease of assembling the outer ring is improved.

The present invention can be applied to the case of performing a drawing process on a circular plate shaped raw material to obtain an intermediate raw material. In this case, in order to manufacture this kind of outer ring for a shell-type radial needle bearing, first a metal plate, having a thickness dimension that is equal to or greater than the thickness dimension of the bottom plate section of the outer ring for a shell-type radial needle bearing to be manufactured, is punched to form a circular plate shaped metal raw material. Next, by performing a drawing process on the portion near the outside in the radial direction of this raw material and plastically deforming the raw material between the inner circumferential surface of a cylindrical shaped concave die and the outer circumferential surface of a cylindrical shaped convex punch, the thickness dimension is reduced and a cylindrical shape is formed to obtain an intermediate member having a cylindrical section and a bottom plate section. After that, shot peening is performed on that intermediate raw material to create residual compressive stress in the surface layer section of the cylindrical section and bottom plate section.

Effect of the Invention

With the present invention, in an outer ring for a shell-type radial needle bearing having construction for keeping friction loss at the area of contact between the end surface of the inside member and the inner surface of the bottom plate section, by applying residual compressive stress to the surface layer section on the outer surface side of the bottom plate section and the cylindrical section, it is possible to improve the fatigue strength of the bottom plate section and the continuous section between the bottom plate section and the cylindrical section without the outer ring becoming large due to increasing the outer diameter and thickness dimensions, and without the shape of the bottom plate section becoming complex.

Moreover, by obtaining the outer ring for a shell-type radial needle bearing of the present invention is obtained by performing shot peening after the intermediate raw material, it is possible to improve the adhesion of an anti-corrosion coating on the outside surface of the bottom plate section and/or the outer circumferential surface of the cylindrical section of the outer ring, removes oxides from these surfaces of the outer ring before assembly, improve the ease of assembly of the outer ring, and prevent the outer ring from coming out of the bearing and positional shift such as rotation of the rotating shaft due to this by improving the surface characteristics of the outer circumferential surface of the cylindrical section.

Furthermore, in the method for obtaining the intermediate raw material by performing a drawing process on a circular plate shaped raw material to form a cylindrical shape, the rigidity of the bottom plate section against an axial load is sufficiently increased by making the thickness dimension of the bottom plate section greater than the thickness dimension of the cylindrical section, so the outer ring for a shell-type radial needle bearing of the present invention can be manufactured with good precision using a metal raw material that can be obtained at low cost.

ILLUSTRATIVE EMBODIMENTS FOR CARRYING OUT THE INVENTION

Figure 6:
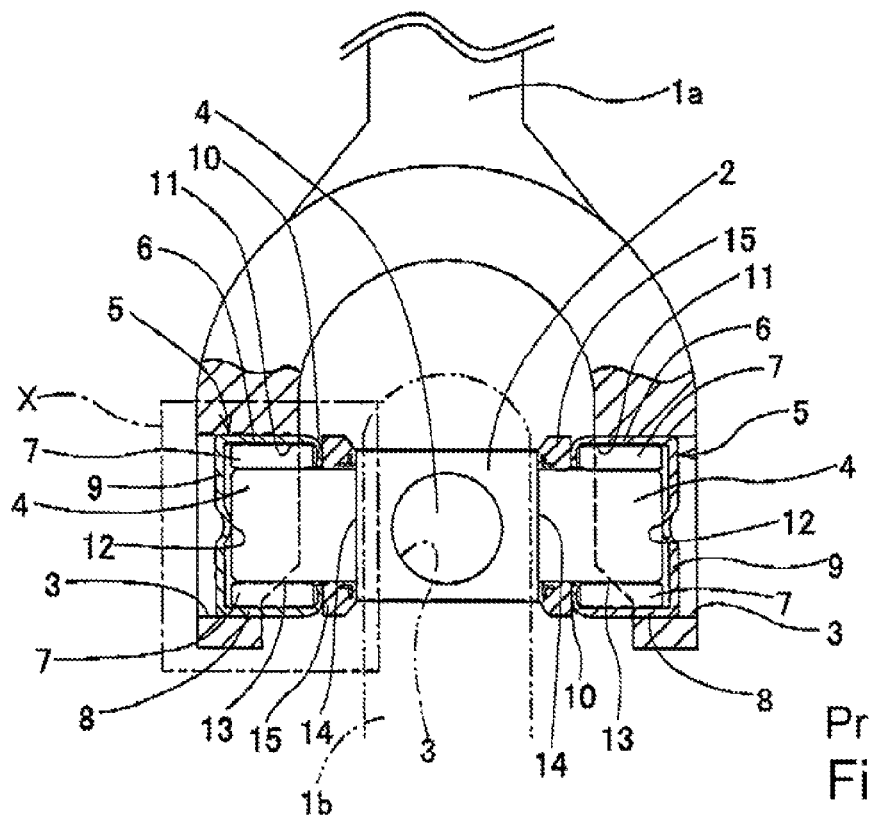
FIG. 6 is a partial cross-sectional view of a universal joint in which a conventionally known shell-type radial needle bearing is assembled.
Figure 7:
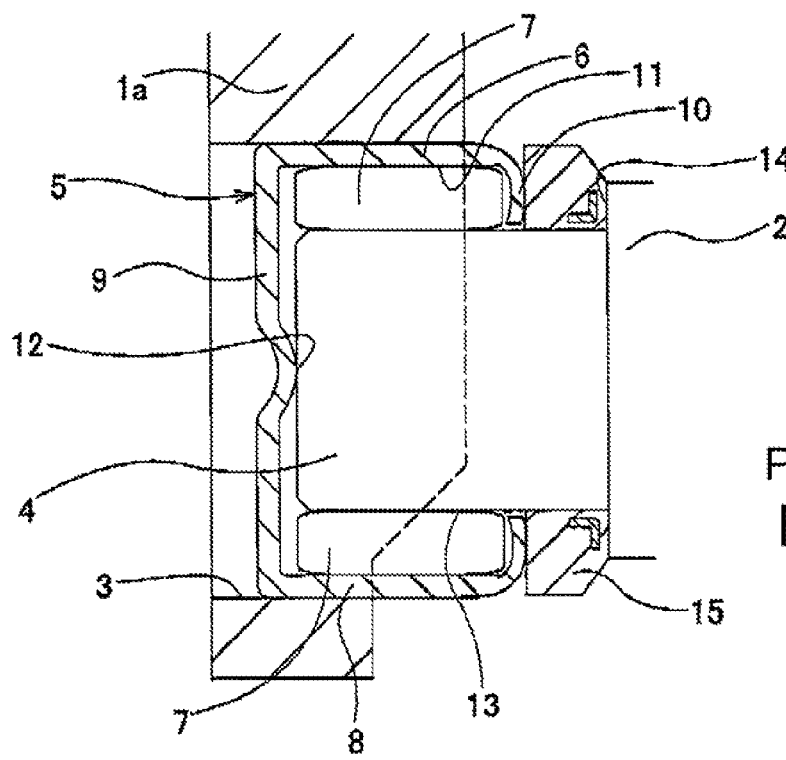
FIG. 7 is an enlarged view of part X in FIG. 6.
Figure 8:
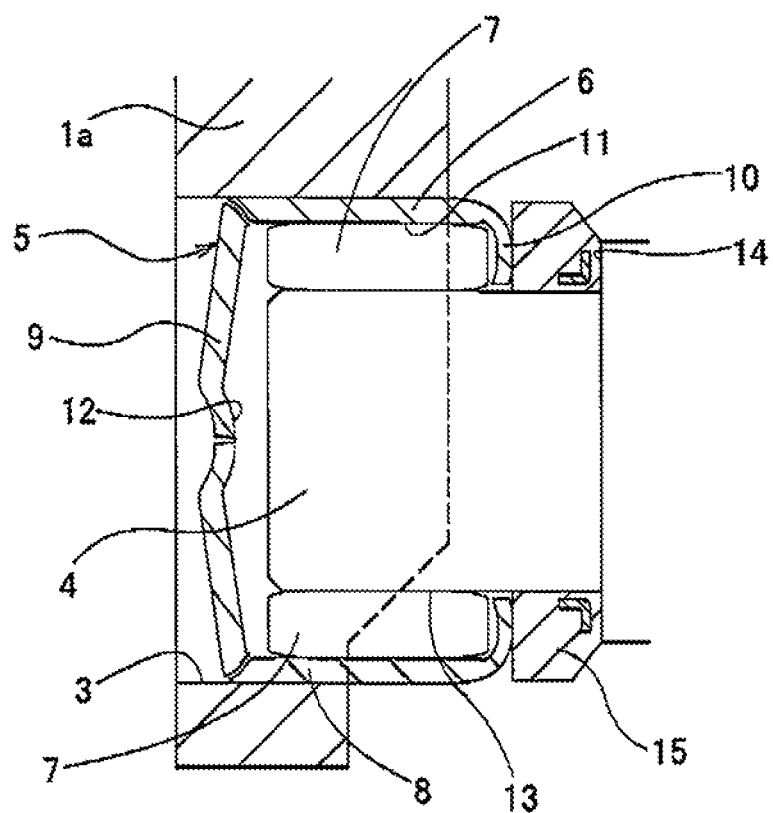
FIG. 8 is a drawing similar to FIG. 7, and illustrates the state in which the bottom plate section has broken due to stress that is repeatedly applied in the axial direction to the bottom plate section of the outer ring from the shaft section of the joint cross.
Figure 9:
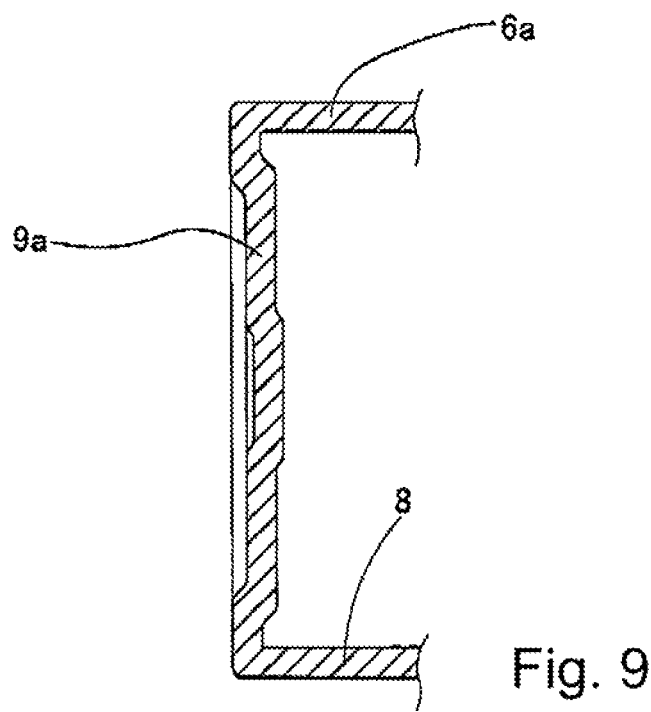
FIG. 9 is a partial cross-sectional view of an example of an outer ring wherein the cross-sectional shape of the bottom plate sections is a multi-stepped shape.

In the following, an embodiment of the present invention will be explained with reference to the accompanying drawings. The feature of this embodiment is that method of manufacturing the outer ring 6a has been devised such that together with causing there to be residual compressive stress at a specified distribution in an outer ring 6a that is cylindrical shaped with a bottom and comprises a cylindrical section 8a and a bottom plate section 9a, the thickness dimension (T) of the bottom plate section 9a of the outer ring 6a is greater than the thickness dimension (t) of the cylindrical section 8a (T>t). The construction and function of other parts are the same as in the case of the conventional construction illustrated in FIG. 6 and FIG. 7, so any redundant drawings and explanations are omitted and simplified, with the explanation below centering on the features of this embodiment. The explanation below presumes that the outer ring for a shell-type radial needle bearing of the present invention is assembled in a joint cross type of universal joint for an automobile, however, the present invention is not limited to this use.

The outer ring 6a for a shell-type radial needle bearing to which the present invention is applied is formed using a metal material into a single member having cylindrical shape with a bottom. The metal material that is used is a ferrous alloy metal plate such as chrome molybdenum steel such as SCM415, cold rolled steel such as SPCC, heat treatment steel such as case hardening steel, cold rolled special strip steel such as SAE1010 and the like of which at least the surface can be hardened by heat treatment. In this outer ring 6a, the end surface of the shaft section 4, which is an inside member, and the inner surface of the bottom plate section 9a of the outer ring 6a come in contact at only the center section, and the portion near the outside in the radial direction of these surfaces do not come in contact. With this kind of construction, the axial load due to relative displacement in the axial direction of the shaft section 4, which is an inside member, and the yokes 1a, 1b, which is an outside member, and the friction force (friction moment) that acts on the area of contact between these surfaces due to relative rotation of the shaft section 4 and the yoke 1a, 1b are kept small. Moreover, this construction makes it possible to reduce friction loss that occurs at the area of contact between these surfaces, and to improve the transmission efficiency of various kinds of machines in which the outer ring for a shell-type radial needle bearing of the present invention is assembled. In this embodiment, a protruding curved surface layer section that protrudes toward the end surface of the opposing surface, which is the end surface of the shaft section 4, is formed in the center section of the inner surface of the bottom plate section, however, it is also possible to form a convex curved surface layer section that protrudes toward the inner surface of the opposing surface, which is the inner surface of the bottom plate section, in the center section of the end surface of the shaft section 4.

As a result of allowing contact between the end surface of the shaft section 4, which is an inside member, and the inner surface of the bottom plate section 9a in order to reduce the friction loss in this way, when the shaft section 4 displaces in the axial direction in a direction such as to push against the outer ring 6a for the shell-type radial needle bearing, and the shaft section 4 pushes the center section of the inner surface of the bottom plate section 9a, there is a tendency for the bottom plate section 9a to elastically deform in a direction such that the outer surface becomes a convex surface. As a result, a tensile stress is applied to the outer surface of this bottom plate section 9a, and a bending moment is applied to the bent section 16, which is the continuous section between the bottom plate section 9a and the cylindrical section 8a.

In the outer ring for a shell-type radial needle bearing of the present invention, the residual compressive stress in the surface layer section (surface and a surface layer section having a specified depth) on the outer surface side of the cylindrical section 8a and the bottom plate section 9a is greater than that on the inner surface side, so this residual compressive stress acts as a force for deterring damage such as cracking from occurring in the bottom plate section 9a due to tensile stress and in the bent section 16 due to a bending moment. In other words, when there is residual compressive stress in the outer surface of the bottom plate section 9a, that residual compressive stress acts as a force that resists the elastic deformation (expansion of the outer surface side) of the bottom plate section 9a in a direction in which the outer surface side would become a convex surface even though the center section of the end surface of the shaft section 4 pushes against the inner surface of the bottom plate section 9a. That is, of the rigidity of the bottom plate section 9a, the rigidity of the bottom plate section 9a against a force in a direction that would cause the outer surface side to become a convex surface becomes high.

Moreover, when shot peening is employed as a way to create this residual compressive stress, the rigidity of this bottom plate section becomes high due to this work hardening. Therefore, even when the end surface of the shaft section 4 presses the inner surface of the bottom plate section 9a, the bottom plate section 9a does not elastically deform, or even in the case that it does elastically deform, that amount of deformation is kept small. As a result, it becomes difficult for damage such as cracking to occur in the bottom plate section 9a and the bent section 16. Furthermore, when there is a tendency for cracking to occur in the bottom plate section, the residual compressive stress that exists in the surface layer section of the outer surface side of the bottom plate section 9a acts in a direction that closes off the cracking, so from this aspect as well, an effect for preventing damage is obtained.

The present invention causes residual compressive stress to exist in the surface layer section of the outer circumferential surface of the cylindrical section 8a and the outside surface of the bottom plate section 9a of the outer surfaces of the outer ring 6a. In this embodiment, shot peening is performed by projecting granular projectiles against the outer circumferential surface of the cylindrical section 8a and the outside surface of the bottom plate section 9a. This causes there to be residual compressive stress in the surface layer section of the outer surface side of the cylindrical section 8a and the bottom plate section 9a.

In the present invention, the size of this residual compressive stress is 700 MPa to 1600 MPa in a surface layer section from the surface to a depth of 0.03 mm on the outer surface. The dimension in the radial direction of the outer ring 6a for a shell-type radial needle bearing to which the present invention is applied, including that assembled in a universal joint for a typical steering apparatus, is in the range of 5 mm to 50 mm, and more preferably in the range of 5 mm to 30 mm. In the case of a range of this size, by regulating the value of the residual compressive stress in the surface layer section on the outer surface side of the cylindrical section 8a and bottom plate section 9a such that it is in the range above, it is possible to sufficiently increase the rigidity of the bottom plate section 9a, and it is possible to obtain a sufficient effect of preventing damage such as cracking. Preferably the residual compressive stress in this surface layer section is in the high part of this range, for example 1000 MPa or greater, or even more preferably, 1200 MPa or greater. However, even though the residual compressive stress in the surface section may be greater than 1600 MPa, only the cost for increasing the value of this residual compressive stress becomes uselessly high, and a larger effect of improving the durability cannot be expected, so the upper limit should be kept at about 1600 MPa.

Moreover, in this embodiment, the size of the residual compressive stress on the surface of the surface section on the outer surface side of the cylindrical section 8a and the bottom plate section 9a is 1100 MPa to 1500 MPa. As a result, the rigidity of bottom plate section 9a is increased even more, and it is further possible to sufficiently obtain an effect of preventing damage such as cracks. Due to the same reason as above, the size of the stress is preferably 1200 MPa or greater, and even more preferably, 1300 MPa or greater, however, the upper limit is kept at about 1500 MPa.

There is residual compressive stress in the cylindrical section 8a and base plate section 9a due to the drawing process. When there is residual compressive stress in inner surface side, the value of the residual compressive stress on this inner surface side is kept small, and that value is kept at a value that is sufficiently smaller than the value of the residual compressive stress in the outer surface side. In other words, in the present invention, the residual stress on the inner surface side of the cylindrical section 8a and the bottom plate section 9a is not a tensile stress with the possibility of causing cracking, but is limited to a compressive stress that acts in a direction that suppresses cracking, so the value of the residual compressive stress is not a problem. Therefore, the value of the residual compressive stress on these inner surfaces can be small. When there is a large residual compressive stress in these inner surfaces, the residual compressive stress promotes elastic deformation of the bottom plate section 9a in a direction so that the outer surface side becomes a convex surface, so is not preferable. Therefore, processing to create residual compressive stress on the inner surface side of the cylindrical section 8a and bottom plate section 9a is not performed, and even though processing may be performed, the processing is kept to a minor amount. When performing shot peening for creating residual compressive stress in the surface layer section on the outer surface side, the projectile material is kept from entering the inside of the outer ring with much force.

From the aspect of improving durability of the outer circumferential surface of the cylindrical section 8a and the surface layer section of the cylindrical section, there is little necessity to create large residual compressive stress. However, depending on the shot peening conditions, there is a possibility that remaining compressive stress will occur in the outer circumferential surface of cylindrical section 8a and the surface layer section thereof when applying residual compressive stress to the outside surface of the bottom plate section 9a and the surface layer section thereof, however, the existence of a large residual compressive stress in this section is not particularly a problem.

Furthermore, in the case of this embodiment, the thickness dimension (T) of the bottom plate section 9a is greater than the thickness dimension (t) of the cylindrical section 8a (T>t). As a result, the rigidity of the bottom plate section 9a becomes even higher, and the effect of preventing damage such as cracking is increased even more. The greater the rigidity is, the thickness dimension (T) of this bottom plate section 9a is 105% or greater than the thickness dimension (t) of the cylindrical section 8a (T≥1.05t), and preferably 120% or greater (T≥1.2t). Even when the thickness dimension (T) of the bottom plate section 9a is the same as the thickness dimension (t) of the cylindrical section 8a (T=t), a sufficient effect can be obtained by applying a residual compressive stress to the surface layer section on the outer surface side of the cylindrical section 8a and the bottom plate section 9a, however, by matching this stress to the dimensional restrictions, it is possible to improve the rigidity of the bottom plate section 9a and the continuous section between the bottom plate section 9a and cylindrical section 8a.

The upper limit for increasing the thickness dimension of the bottom plate section 9a is restricted from the aspect of the maintaining strength of the bottom plate section 9a and from the aspect of maintaining ease of processing. The cylindrical section 8a functions as the outer ring of the radial needle bearing, and therefore, by fitting the cylindrical section 8a into the circular hole 3 of the yoke 1a, 1b, which is an outside member, with an interference fit, even when the cylindrical section 8a is backed up by the inner circumferential surface of the circular hole 3, a minimum necessary thickness (t), for example 1 mm to 1.2 mm, is necessary from the aspect of maintaining the rolling fatigue life of the inner circumferential surface, which is the outer raceway, and depending on the usage, a thickness of 1.5 mm to 2 mm may be maintained. On the other hand, even when the thickness dimension (T) of the bottom plate section 9a is made greater than necessary, not only does the effect of improving the fatigue strength of the bottom plate section 9a and the bent section 16 become saturated, but processing becomes troublesome, and the weight of the outer ring 6a for the radial needle bearing becomes needlessly heavy. Therefore, making the thickness dimension (T) of the bottom plate section 9a greater than the thickness dimension (t) of the cylindrical section 8a by 200% or more is not preferable. Preferably is kept within 150%

Taking the above into consideration, the thickness dimension (T) of the bottom plate section 9a is made to be 105% to 200% greater than the thickness dimension (t) of the cylindrical section 8a (T=(1.05 to 2) t), and preferably, 120% to 150% greater (T=(1.2 to 1.5) t). More specifically, when the thickness dimension (t) of the cylindrical section 8a is 1 mm to 1.2 mm, and in some cases, 1.5 mm to 2 mm, the thickness dimension (T) of the bottom plate section 9a is taken to be 1.2 mm to 3 mm.

The thickness of the opening end section of the cylindrical section 8a is thin, and this thin section is bent inward in the radial direction to form an inward facing flange section 10, and this inward flange section 10 prevents the plurality of needles 7 that are arranged between the inner circumferential surface (outer raceway) of the cylindrical section 8a and the outer circumferential surface (inner raceway) of the shaft section 4, which is an inside member, from coming out. There is no particular need for there to be residual compressive stress in the surface layer section on the outer surface side of the inward facing flange section 10. However, similarly, when performing shot peening of the outer surface side of the cylindrical section 8a and the bottom plate section 9a, the projectile material hits against the inward facing flange section 10, so residual compressive stress in the surface layer section of this inward facing flange section 10 is allowable. By devising the direction for projecting the projectile material, the inward facing flange 10 can prevent the projectiles from entering inside the outer ring 6a with great energy. Therefore, when performing shot peening, it is not particularly necessary to close off the opening section of the outer ring 6a.

In the present invention, when performing shot peening in order to create residual compressive stress in the surface layer section on the outer surface side, a known shot peening apparatus can be used. The material, the particle size, the projection time and the like of the projectiles are set appropriately according to the desired value of the residual compressive stress and the shape and size of the outer ring 6a. These conditions differ case by case, so as necessary, the appropriate values are found by performing testing.

In the present invention, in case that anti-corrosion coating is performed for the surface on the outer surface side of the outer ring 6a, when the shot peening conditions are set according to the desired value of the residual compressive stress and the like, the adhesion characteristics of the anti-corrosion coating should be taken into consideration at the same time, and by optimizing the conditions, such as the material of the projectile, it is possible to obtain a surface on the outer surface side that has excellent adhesion that corresponds well with the type of anti-corrosion coating. As a result, it is also possible at the same time to improve the anti-corrosion properties of the outer ring 6a. The adhesion can be adjusted by controlling the surface roughness of the surface on the outer surface side of the cylindrical section 8a and the bottom plate section 9a.

Similarly, by optimizing the shot peening conditions according to the existence conditions of oxides on the surface of the outer ring 6a before assembly, it is also possible to remove the oxides from the surface at the same time when the value of the residual compressive stress is adjusted by shot peening. As a result, it is also possible at the same time to improve the ease of assembly of the outer ring 6.

Furthermore, it is also possible to optimize the shot peening conditions from the aspect of preventing the outer ring 6a from coming out from the circular hole 3 in the yoke 1a, 1b, and at the same time when the value of the residual compressive stress is adjusted, it is possible to provide an outer circumferential surface to the cylindrical section 8a of the outer ring 6a that will make it difficult for the outer ring 6a to come out from the circular hole 3. In this case as well, the performance of this can be adjusted by controlling the surface roughness of the outer surface side of the cylindrical section 8a of the outer ring 6a.

From the aspects described above, it is also preferable that shot peening be actively performed for the outer circumferential surface of the cylindrical section 8a in addition to the outside surface of the bottom plate section 9a, and the bent section 16, which is the continuous section between the bottom plate section 9a and cylindrical section 8a, which require improved rigidity.

Moreover, surface processing such as surface preparation for improving the surface characteristics of the outside surface of the bottom plate section and the outer circumferential surface of the cylindrical section of the outer ring can be performed by etching such as surface texturing, however, performing this kind of processing separately becomes additional surface processing, which brings about much labor and a large increase in costs, and performing such surface processing cannot provide the surface layer section of the outer surfaces the residual compressive stress required for the present invention. On the other hand, when performing the surface improvement as described above, conventional shot blast conditions may not be sufficient in order to sufficiently increase the effect, and processing may have to be repeatedly performed multiple times. However, by using the conditions of the present invention, it is, as a rule, possible to simultaneously obtain both the effect of providing the required residual compressive stress and the effect of surface improvement.

Next, of the method for manufacturing the outer ring for a shell-type radial needle bearing of the present invention, an example of the method for manufacturing an outer ring 6a, of which the thickness dimension (t) of the cylindrical section 8a and the thickness dimension (T) of the bottom plate section 9a are different, will be explained with reference to FIG. 2. First, as raw material, a metal plate having a thickness dimension that is equal to or greater than the thickness dimension of the bottom plate section of the outer ring 6a to be manufactured is pulled from a coil 18 as illustrated in FIG. 2(A), then this metal plate is punched to obtain a circular disk shaped raw material plate 19 as illustrated in FIG. 2(B). Next, this raw material plate 19 is plastically deformed and drawn between the outer circumferential surface of a first punch 20 and the inner circumferential surface of a first die 21 as illustrated in FIG. 2(C) to form a cylindrical shape having a bottom and obtain a first intermediate raw material 22 that has a cylindrical shape and a bottom. One half (½) of the difference between outer diameter of the first punch 20 and the inner diameter of the first die 21 is less than the thickness dimension of the raw plate 19 and, except for the spring back amount, nearly coincides with the thickness dimension (t) of the cylindrical section 8a. Therefore, through this drawing process, the thickness dimension of the raw plate 19 is reduced and the portion that will become the cylindrical section 8a is formed. On the other hand, the thickness dimension of the portion that will become the bottom plate section 9a is nearly the same as the thickness dimension of the raw plate 19. This kind of drawing process is performed in a plurality of stages. Therefore, there is a plurality of sets of the first punch 20 and first die 21, the shapes of which slightly differ from each other.

Figure 1:
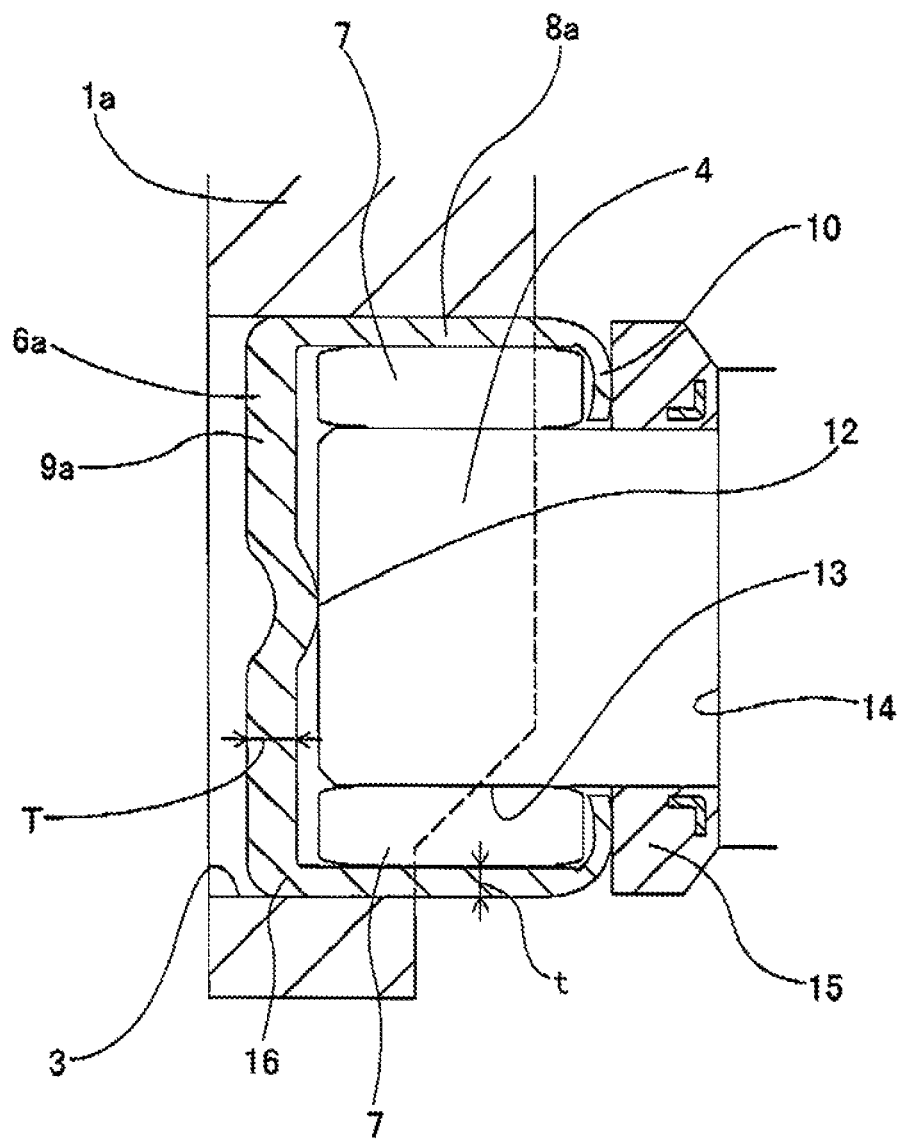
FIG. 1 is an enlarged view corresponding to part X in FIG. 6 of an embodiment of the present invention, and illustrates the assembled state in the location of use.
Figures 2A, 2B, 2C, 2D, 2E, 2F, 2G, 2H:
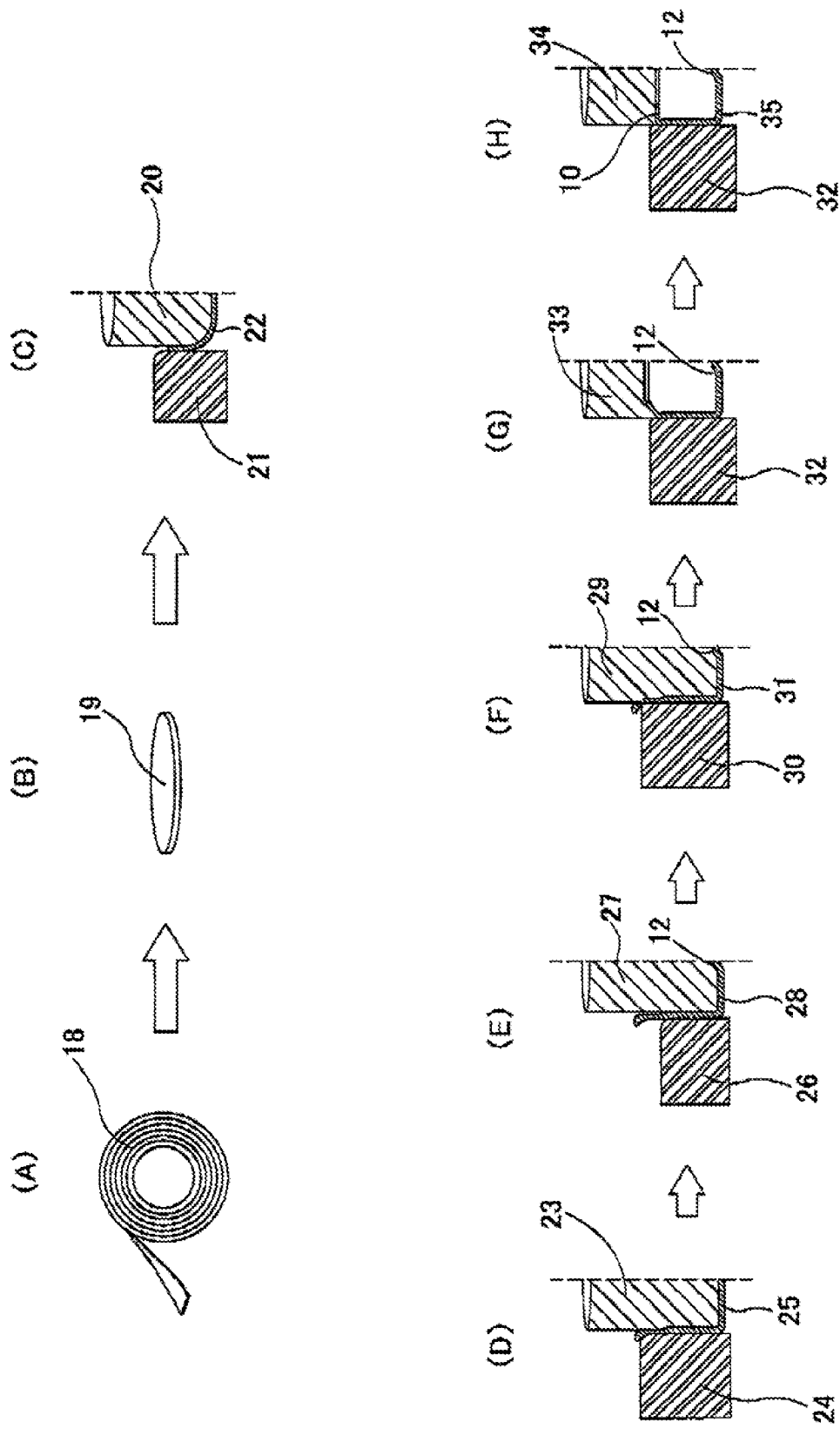
FIG. 2A to FIG. 2H are cross-sectional views illustrating the order of processing of a drawing process for obtaining the outer ring shape.

Next, as illustrated in FIG. 2(D), of the first intermediate raw material 22, the tip end section of the portion that will become the cylindrical section 8a is pressed between a second punch 23 and second die 24, to form a second intermediate raw material 25 having a thin section that will become the inward facing flange section 10.

Next, as illustrated in FIG. 2(E), with the second intermediate raw material 25 held by a third die 26, the portion of this second raw material 25 that will become the bottom plate section 9a is pressed between the tip end surface of a third punch 27 and the tip end surface of a counter punch (not illustrated in the figure), to form a third intermediate raw material 28 having a partial spherical convex curved surface 12 in the center section on the inner surface of the portion that will become the bottom plate section 9a.

Then, as illustrated in FIG. 2(F), this third intermediate raw material 28 is held between a fourth punch 29 and a fourth die 30, and the excess portion on the tip end section of the thin section that will become the inward facing flange section 10 is removed (trimmed), to obtain a fourth intermediate raw material 31.

Next, as illustrated in FIG. 2(G) and FIG. 2(H), with this fourth intermediate raw material 31 being held by a fifth die 32, the thin portion of this fourth intermediate raw material 31 is sequentially bent using a preliminary bending punch 33 and finishing bending punch 34, to form this thin section into the inward facing flange section 10, obtaining the final intermediate raw material 35 illustrated in FIG. 2(H). This final intermediate raw material 35 corresponds to the intermediate raw material of the present invention having a cylindrical section and bottom plate section.

Next, heat treatment is performed in order to increase the hardness of the inner surface of the cylindrical section 8a that will function has the outer raceway to the necessary level. Finally, shot peening is performed on this final intermediate raw material 35 to create residual compressive stress in the surface layer sections of the surfaces of the cylindrical section 8a and the bottom plate section 9a.

The outer ring 6a, which is constructed as described above so as to have construction according to the present invention, has construction that is able to keep friction loss that occurs at the area of contact between the end surface of the shaft section 4 of a joint cross 2 of a universal joint and the inner surface of the bottom plate section 9a low, so it is possible to improve the fatigue strength of the bottom plate section 9a and the continuous section between the bottom plate section 9a and the cylindrical section 8a without the outer diameter dimension or thickness of the outer ring 6a becoming large, and without the shape of the bottom plate section 9a becoming complex. Furthermore, by improving adhesion of an anti-corrosion coating or by eliminating the effect of oxides, it is also possible to improve the resistance to corrosion of the outer ring 6a. Furthermore, by adjusting the surface properties of the outer circumferential surface of the cylindrical section 8a of the outer ring 6a, the outer ring 6a can be prevented from coming out and it is possible to provide an outer ring 6a that will have not positional shifting in rotation of the universal joint and the like.

In the embodiment described above, the case of manufacturing the outer ring for a shell-type radial needle bearing of the present invention by performing a drawing process of a raw metal (ferrous alloy) plate that can be hardened by at least heat treatment was explained. However, the outer ring for a shell-type radial needle bearing of the present invention can be manufactured by performing cold forging, which is a kind of plastic working, of a column shaped raw material such as disclosed in JP2008-188610. In this case as well, an intermediate raw material that is cylindrical shaped with a bottom is formed such that the thickness dimension of the bottom plate section is greater than the thickness dimension of the cylindrical section, and heat treatment to improve surface hardness, and shot peening to create residual compressive stress in the outer surface are performed on this intermediate raw material. In the case of manufacturing the outer ring for a shell-type radial needle bearing by this kind of cold forging, in exchange for increasing equipment costs by having to increase the strength of the dies, and to increase the capacity of the press when compared with the case of drawing raw plate, it is possible to improve the material yield. Therefore, in the case of mass production, it is possible keep manufacturing costs low when compared with the drawing process.

EXAMPLE

Figure 3:
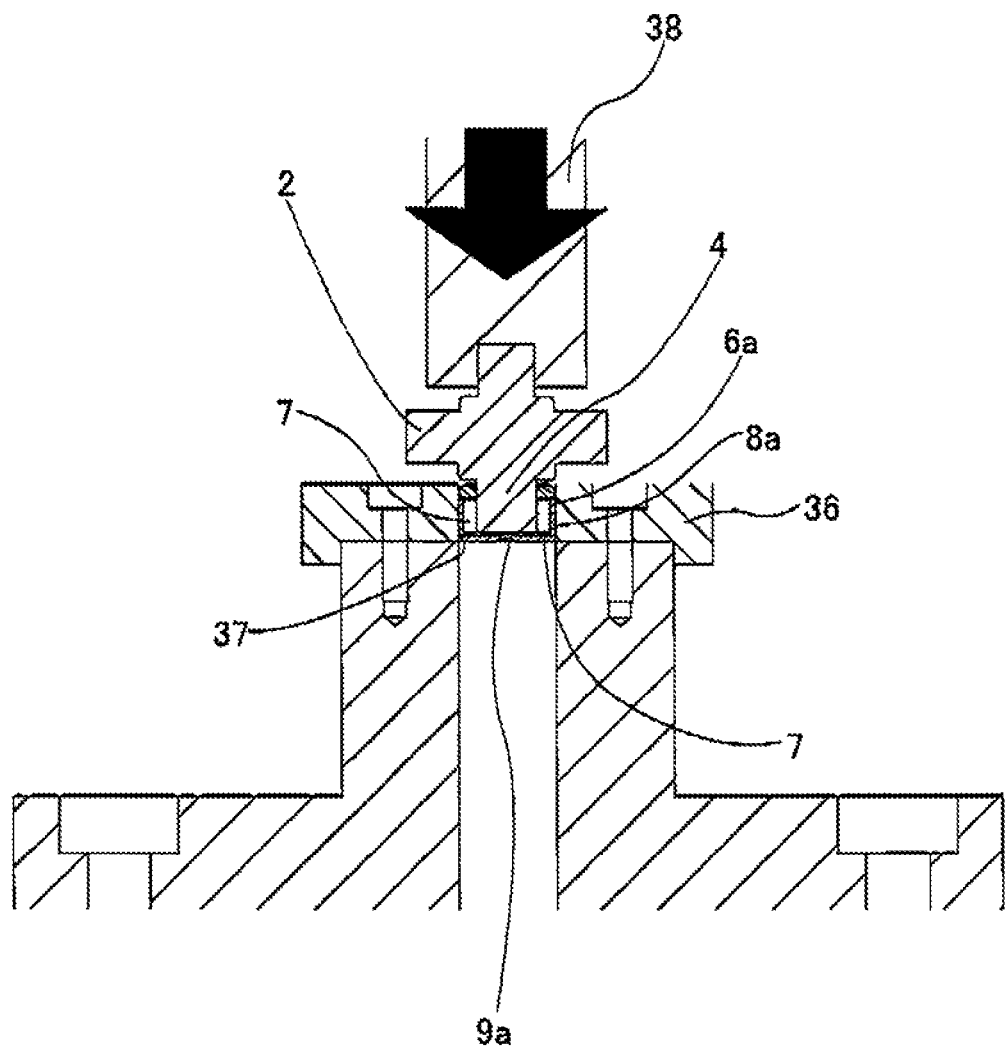
FIG. 3 is a cross-sectional view of a testing apparatus that is used in testing for checking the effect of the present invention.

Testing that was performed in order to confirm the effect of the present invention will be explained. In this testing, as illustrated in FIG. 3, the cylindrical section 8a of a sample outer ring 6a was fitted inside a hole 37 of a holder 36 using an interference fit. This hole 37 is a through hole, so the bottom plate section 9a of the outer ring 6a was not backed up. In this state, a plurality of needles 7 and the shaft section 4 of a joint cross 2 were inserted into the outer ring 6a, and the tip end surface of the shaft section 4 was brought into contact with the inner surface of the bottom plate 9a. A pressure rod 38 was used to press the tip end surface of the shaft section 4 against the inner surface of the bottom plate section 9a with a fluctuating load that fluctuates within the range of 500 N to 1500 N, and number of times the load was applied until damage such as cracking occurred in the sample outer ring 6a was measured.

As samples, three of each kind of three types of samples, having a bottom plate thickness (T) of 0.84 mm, 1 mm and 1.2 mm, were made for a total of nine samples, were made, and sixteen samples having sixteen different values of residual compressive stress in the surface layer section of the outer surface side of the cylindrical section and the bottom plate section of the outer ring 6a were prepared. The nine samples having different bottom plate thicknesses had values of residual compressive stress in the surface layer section of 1000 MPa to 1200 MPa. Also, the sixteen samples having different residual compressive stress had a bottom plate thickness (T) of 1.25 mm. The outer diameter of the outer ring in all of the samples was 16 mm, the thickness (t) of the cylindrical section was 1 mm in all of the samples, and the material was SCM415 in all of the samples. Shot peening to create residual compressive stress was not performed for the inner surface of the outer ring, so the only residual compressive stress in the inner surface was that due to the drawing process. Therefore, the value of the residual compressive stress in the inner surface of the outer ring was about the same level as in the outer surface side before shot peening was performed. The results of the testing performed under these conditions are given in FIG. 4 and FIG. 5.

Figure 4:
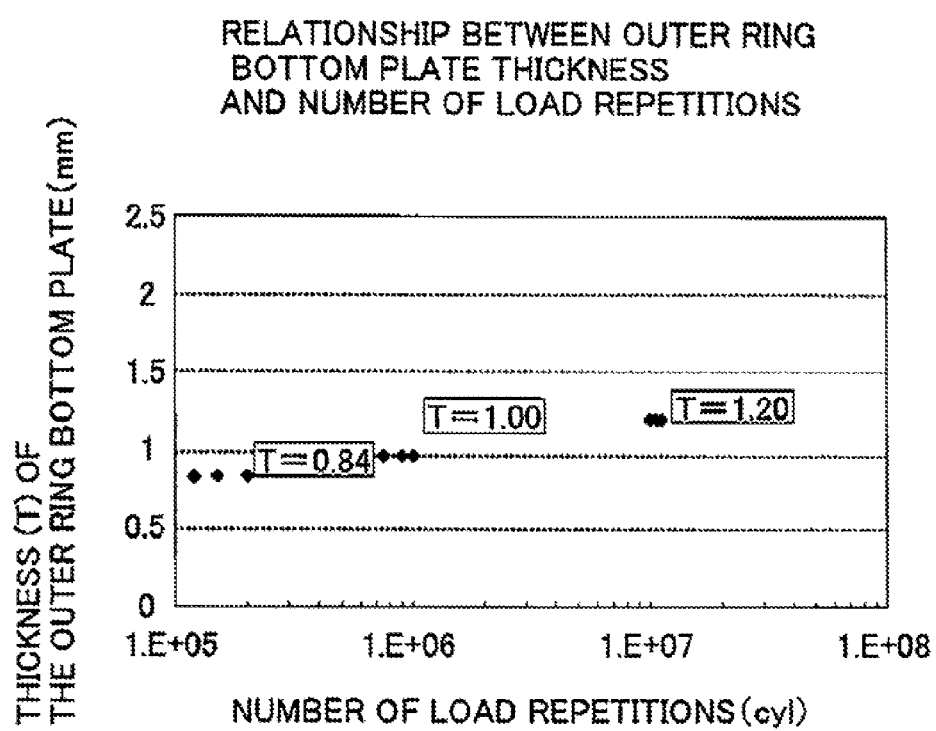
FIG. 4 is a graph illustrating the test results of testing that was performed for learning the effects that the dimension of the thickness of the bottom plate section of the outer ring has on durability of the outer ring.

FIG. 4 illustrates the effect that the thickness (T) of the bottom plate section has on the durability (the number of times an axial load is repeated until damage occurs). As can be seen from FIG. 4, when the thickness (T) was 0.84 mm, the outer ring became damaged after the load was repeatedly applied 120,000 to 200,000 times, when the thickness (T) was 1 mm, damage to the outer ring occurred after the load was repeatedly applied 740,000 to 1 million times, and when the thickness (T) was 1.2 mm, the number of times the load was repeatedly applied before damage occurred greatly increased to 10 million to 11 million times.

Figure 5:
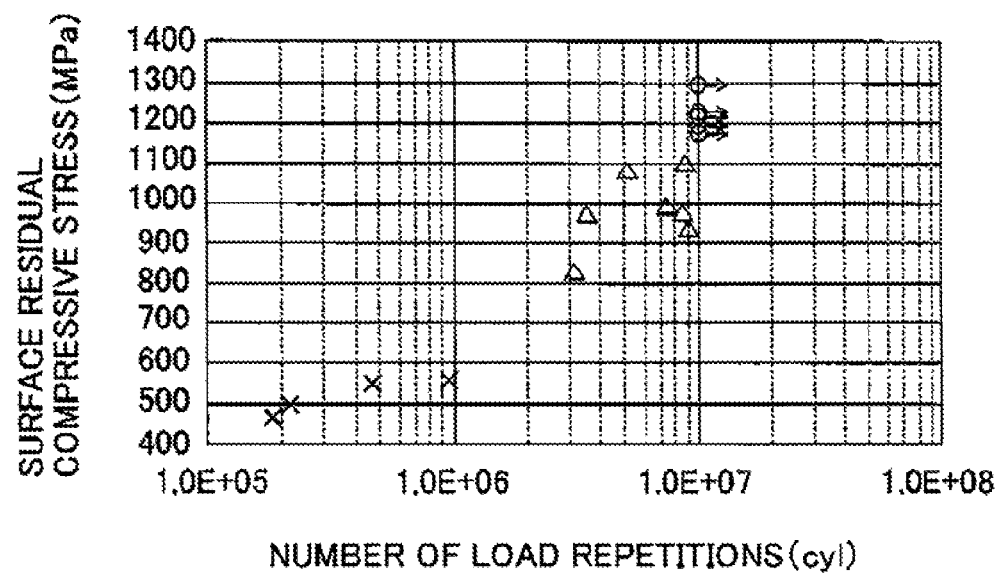
FIG. 5 is a graph illustrating the test results of testing that was performed for learning the effects that the residual compressive stress in the surface layer section of the outer surfaces of the outer ring has on durability of the outer ring.

On the other hand, FIG. 5 illustrates the effect that the value of the residual compressive stress in the surface layer section has on durability (the number of times an axial load is repeated until damage occurs). As can be seen from FIG. 5, when the residual compressive stress was 460 MPa to 560 MPa, damage occurred after the load was repeatedly applied 180,000 to 940,000 times, however, when the residual compressive stress was 830 MPa to 1290 MPa, the number of times the load was repeatedly applied before damage occurred greatly increased to 3.15 million to 10 million times.

In testing the durability of the outer ring for a shell-type radial needle bearing in which normally 1 million times is the OK level, when the residual compressive stress exceeds 700 MPa, the load could be repeatedly applied 3 million times or more, and when the residual compressive stress exceeds 1100 MPa, the load could be repeatedly applied 10 million times or more before damage occurred. In testing, when damage did not occur even after applying the load 10 million times, testing was ended as being OK.

INDUSTRIAL APPLICABILITY

The present invention can be suitably applied to the outer ring for a shell-type radial needle bearing that is assembled in the rotation support section of a joint cross type universal bearing for an automobile, however, the invention is not limited to this, and can be widely applied to the outer ring of shell-type radial needle bearings having a cylindrical shape with a bottom that are assembled in various kinds of machinery for which strength of the bottom plate and anti-corrosion of the outer ring are required.

EXPLANATION OF REFERENCE NUMBERS 1a, 1b Yoke
2 Joint cross
3 Circular hole
4 Shaft section
5 Shell-type radial needle bearing
6, 6a Outer ring
7 Needle
8, 8a Cylindrical section
9, 9a Bottom plate
10 Inward facing flange section
11 Outer raceway
12 Convex curved surface
13 Inner raceway
14 Stepped section
15 Seal member
16 Bent section
18 Coil
19 Raw plate
20 First punch
21 First die
22 First intermediate raw material
23 Second punch
24 Second die
25 Second intermediate raw material
26 Third die
27 Third punch
28 Third intermediate raw material
29 Fourth punch
30 Fourth die
31 Fourth intermediate raw material
32 Fifth die
33 Preliminary bending punch
34 Finishing bending punch 35 Final intermediate raw material
36 Holder
37 Hole
38 Pushing rod

What is claimed is:

1. An outer ring for a shell-type radial needle bearing that is formed using a metallic material into a single bottomed cylindrical shaped member, comprising:
   a cylindrical section having an outer raceway formed around the inner circumferential surface thereof; and
   a bottom plate section that closes off an opening on one end of the cylindrical section,
   the outer ring used in a state that the cylindrical section is fitted and fastened inside a circular hole that is formed in an outside member; a plurality of needles are located between the outer raceway and an inner raceway formed around an outer circumferential surface of an end section of a circular column shaped inside member so as to be able to roll freely; and an end surface of the inside member comes in contact with a center section of the inner surface of the bottom plate section,
   wherein the residual compressive stress is given by performing a way of creating the residual compressive stress on the outer surface side of the cylindrical section and the bottom plate section, such that the value of residual compressive stress existing on the inner surface side of the cylindrical section and the bottom plate section after the way is performed is the same level as the value of residual compressive stress existing on the outer surface side of the cylindrical section and the bottom plate section before the way is performed, and the value of the this residual compressive stress is larger in the surface layer section on the outer surface side of the cylindrical section and the bottom plate section than in the surface layer section on the inner surface side of the cylindrical section and bottom plate section after the way is performed; and
   of the surface layer section on the outer surface side of the cylindrical section and the bottom plate section, the size of the residual compressive stress in the surface layer section from the surface to a depth of 0.03 mm is 1100 MPa to 1600 MPa.

2. The outer ring for a shell-type radial needle bearing according to claim 1, wherein the ratio between the thickness dimension of the bottom plate section and the thickness dimension of the cylindrical section is in the range 1.05 to 2.

3. The outer ring for a shell-type radial needle bearing according to claim 2, wherein the thickness dimension of the bottom plate section is 1.2 mm to 3 mm.

4. The outer ring for a shell-type radial needle bearing according to claim 1, wherein there are no oxides on the surface on the outer surface side of the cylindrical section and the bottom plate section.

* * * * *